July 3, 1945.  F. A. HARTUNG  2,379,520
ADJUSTABLE TOOL HOLDER
Filed March 16, 1944
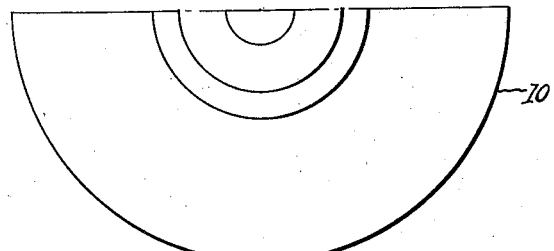
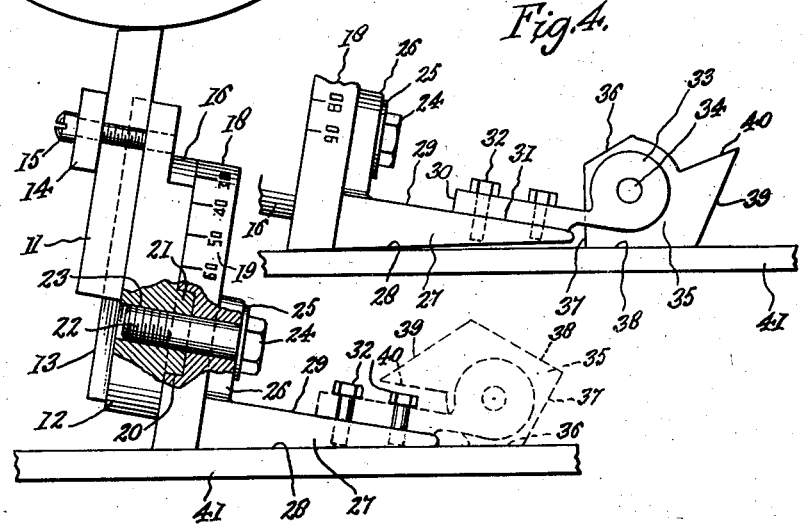
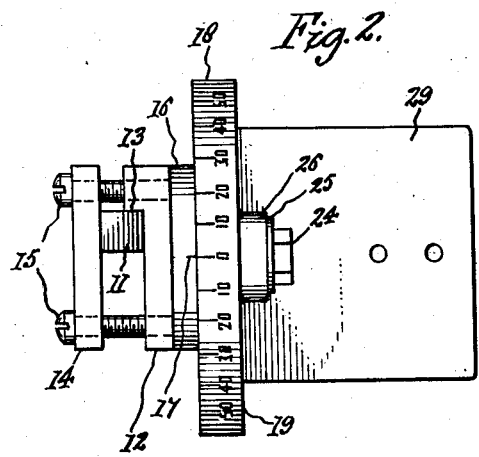
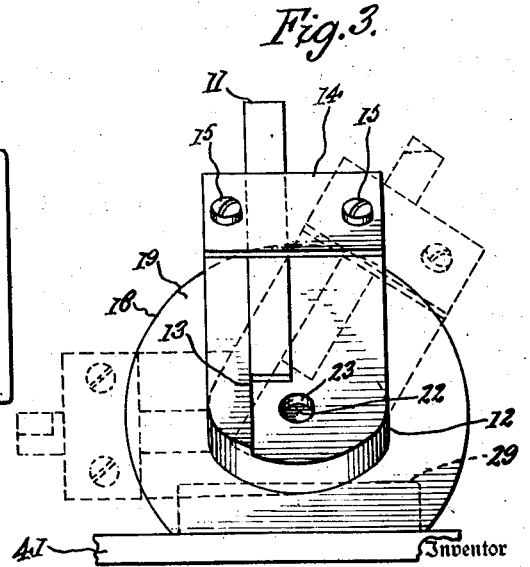
Inventor
Frederick A. Hartung
By Mawhinney & Mawhinney
Attorneys Patented July 3, 1945

2,379,520

UNITED STATES PATENT OFFICE 2,379,520

ADJUSTABLE TOOLHOLDER

Frederick A. Hartung, Salem, Mass.

Application March 16, 1944, Serial No. 526,766

3 Claims. (Cl. 51—220)

The present invention relates to improvements in adjustable tool holders, and is applicable more particularly for use in connection with milling and grinding machines by which tool edges are ground and formed.

The primary object of the invention is to provide an improved adjustable tool holder for holding cutting tools in such position that the grinding wheel will grind the cutting edges of the tools to the precise angle desired.

At the present time it is the custom of the trade to hold the tool by hand and shape it by manually holding it against the grinding wheel. This manual method makes for a considerable amount of vibration. When the tool has a carboloid cutting edge, the vibration causes the edge to chip. This results in a considerable amount of waste in time, material and effort. It is the object and purpose of the present invention to provide a mechanical holder which will eliminate such vibration in the tool with the result that the angle is cut exactly in accordance with the specifications.

Other objects of the invention are to provide for simplicity in the mechanical details and assembly of the holder, in facilitating the matter of angular adjustment of the holder and tool, to so mount the adjustable holder in conjunction with a scale that its angular position may be accurately arrived at without delay and without intermediate calculation, and to provide means whereby the tool edge may be presented to the periphery of the grinding wheel at a variety of successive angles in two directions at substantially right angles to one another, thus giving to the holder a wide amplitude of adjustable movement to enable all desired angles of the tool cutting edge to be presented to the grinding wheel.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a side elevation of an improved tool holder constructed in accordance with the present invention, with parts broken away and parts shown in section, and illustrated in connection with a fragment of a milling or other machine and a portion of a grinding wheel.

Figure 2 is a top plan view of the improved holder.

Figure 3 is a front elevation of the holder, and

Figure 4 is a fragmentary side elevation like Figure 1 with the elevating attachment moved to a subsequent position.

Referring more particularly to the drawing, 10 designates a grinding wheel and 11 the tool to be ground. Such tool 11 is carried in a tool holder 12 having a shoulder 13 against which the tool may be moved, in which position it is retained on the holder 12 by a clamp bar 14 held to the holder 12 by the screws 15 or other desired fastenings.

The tool holder 12 is cut away at its upper rear portion in the form of an arcuate ledge 16 having thereon, in a preferably central position, an index 17 adapted to be deflected over scales 18 inscribed upon the peripheral edge of a circular disc 19. In the front face of the disc is a socket 20 of circular form having a circular perimeter. Received in such socket 20 is a boss or bearing block 21 formed integral with the holder 12 and projecting from the rear face thereof. The rear face of the holder 12 lies in contact with the front face of the disc 19 and is adapted to rotate thereon with the boss 21 forming the journal and the walls of the disc socket 20 constituting the bearing upon which this rotation devolves. In other words the boss 21 has a circular edge for accurately fitting the perimeter of the socket 20. The meeting faces of the socket base and rear wall of the boss 21 are preferably flat.

A pivot screw 22 has a smooth shank portion lying through smooth walled openings in the circular disc 19 and boss 21. The threaded portion of pivot screw 22 is threaded into an internally threaded opening 23 of the holder 12. The screw head 24 engages a washer 25 which is interposed between such screw head 24 and the rear edge of a boss 26 which is formed integral with the disc 19 and outstands from the rear face thereof. Through this boss 26 is also formed a smooth walled opening for the passage of the smooth portion of the shank of the locking screw 22.

The base of the device is indicated at 27 and it is made integral with the circular disc 19. The relation of the disc 19 and the base 27 are such that they combine to form an angle-iron support. The base 27 extends out from the rear lower portion of the disc 19. The bottom and top surfaces 28 and 29 of the base 27 converge in a direction away from the disc 19, the two surfaces 28 and 29 being mutually inclined for this purpose. At the rear edge of the disc the surfaces 28 and 29 approach one another at a rather small acute angle. This imparts a wedge shape form to the base 27. The inclination of the bottom surface 28 is such as to hold the circular disc 19 at an angle to the vertical or in a diagonal position and the lower edge of the disc 19 which is truncated is shaped on this same planar surface as the bottom surface 28.

The top inclined surface 29 cooperates with a shank 30 of an adjusting device. The bottom surface 31 of the shank 30 is adapted to lie in contact with the top surface 29 of the base 27 and to be affixed thereto by two or more screws 32 or other fastening means which will prevent the sidewise movement of the elevating device. The shank 30 carries bearing discs 33 supporting a shaft 34 in which a tumbler or rotator block 35 is journaled. This block is made up of the stepped faces 36, 37, 38 and 39 progressively at greater distances from the center of the drum or block 35. These faces in addition to the step 49 between the highest surface 30 and the lowest surface 36 compose the entire peripheral surface of the rotatable drum 35.

At 41 is shown the bed of the machine, for instance the magnetic chuck or milling machine upon which the base 27 and the drum 35 are adapted to rest.

In the operation of the tool, by backing off the locking screw 22, as by applying a suitable wrench to the hexagonal or other head 24, the holder 12 carrying the clamped tool 11 is free to rotate about an axis passing through the center of the screw 22. The burden of this rotation is, however, carried not by the screw 22 but by the larger bearing surfaces of the cylindrical boss 21 and socket 20. The screw 22 may be carried around with the holder 12 due to friction in the threads 23, or the screw 22 may remain stationary while the threaded opening at 23 rotates relatively to the threaded portion of the screw 22. Figure 3 shows in full lines the vertical position of the holder and tool, and in dotted lines other assumable positions with corresponding angular cuts indicated in the working edge of the tool. In this way the holder 12 which holds the tool 11 in place can be angularly adjusted so that the grinding wheel 10 will grind according to the specified angles. The holder arc 16 is coaxial with the curvature of the calibrated edge 18 of the disc 19 so that as the holder 12 is rotated about its pivot, the index 17 will be deflected over either scale. It will be noted from Figure 2 that the zero graduation is in the center or uppermost portion of the edge 18 and that two scales are struck off from this origin point, one scale proceeding to the right and the other to the left. One scale is for one side face of the tool 11 while the other scale shows the angularity of cut with respect to the opposite side of the tool operating edge. After the index 17 has arrived opposite the desired graduation of the scale, the locking screw 22 is again rotated into binding relation with the parts by giving the same a partial right hand turn whereby the holder 12 will be drawn into tight frictional engagement against the circular disc 19 so that the reaction of the grinding wheel 10 against the tool 11 will not be able to dislodge the holder 12 from its set angular position. By loosening and subsequently tightening the locking screw 22 the angular lateral adjustment of the tool holder 12 may be performed with great facility and celerity.

Therefore the graduated cylindrical scales 18 govern the angle at which the tool 11 is held to the grinding wheel 10. The tool holder is also susceptible of a forward and rearward adjustment by means of the elevating drum 35. In Figure 1 the shortest radius surface 36 is illustrated as resting upon the supporting surface 41; in which case the lower base surface 28 lies throughout in contact with this supporting surface 41.

In Figure 4 the drum 35 is shown as having been rotated through approximately 180°, bringing an intermediate surface 38 against the support 41. Inasmuch as this surface 38 is a greater distance from the center of rotation of the drum 35, the drum and with it the right end of the base 27 will be to that extent elevated. For this purpose the front edge of the disc 19 is the fulcrum for the leverage exerted. In this way, by the selective rotation of the drum 35 one or more of the stepped faces 36, 37, 38 and 39 which are at various radial distances from the drum center of rotation, can be brought to the lowest position for seating upon the supporting surface 41 and thus changing the angle at which the tool edge is presented to the grinding wheel 10. In the position shown in Figure 1 the grinding wheel 10 is cutting the clearance angle of the tool 11. The usual clearance angle in the majority of hand ground tools is ten degrees and this marking may be made alongside the drum surface 36. Alongside the surface 37 may be marked the notation 7°, opposite the surface 38 the notation 5° and along the drum surface 39 the notation 2½°. Certain carbide tools require a clearance of less than 10 degrees and in order to accomplish this the elevating attachment may be fitted to the base 27. When the drum is turned from the position shown in Figure 1, the clearance will be reduced to meet the specifications of carbide and carboloid tools. In other words the base 27 is tapered to give the device the standard 10 degrees angle and also to facilitate the attachment of the shank 30 of the elevating device thereto.

The shoulder 13 forms an angle pocket with the front surface of the tool holder 12 so that the tool 11 is held upon two sides. In placing the tool, the tool bit 11 is located against the front surface of the holder 12 and then slid along until it abuts the shoulder 13. The clamp bar 14 is then tightened upon the tool 11. Thus the tool is held upon three sides as indicated in Figure 2, and the tool is held to proper alinement and in a proper relationship with respect to the scale 18 and the index 17 for accurate angular cutting.

It is obvious that various changes and modifications may be made in the details of construction and design of the above specifically described embodiment of this invention without departing from the spirit thereof, such changes and modifications being restricted only by the scope of the following claims:

What is claimed is:

1. An adjustable tool holder comprising a tool holder member, a support member therefor, a base member extending off the lower rear face of the support member and having mutually inclined lower and upper surfaces, elevating means having a part to lie along and be affixed to said upper inclined surface, said means comprising a shank lying along said upper inclined surface of the base member, bearings on the shank, a shaft journalled in said bearings, and a drum rotatable on said shaft and having circumferentially stepped chord surfaces at various radial distances from the center of rotation.

2. An adjustable tool holder comprising a tool holder member, a base support having mutually inclined lower and upper surfaces, a shank lying along said upper inclined surface of the base member, bearings on the shank, a shaft journalled in said bearings, and a block rotatable on said shaft and having stepped surfaces to tilt said base support to various angles.

3. An adjustable tool holder comprising a tool holder member and a support member for supporting the holder member for angular adjusting movement, said members respectively having cooperating index and scale thereon for showing the degree of the angular adjustment, and elevating means in operative relation to said support member, said means comprising a rotatable drum having circumferentially stepped chord surfaces at various radial distances from the center of rotation.

FREDERICK A. HARTUNG.